July 29, 1947.   P. G. EDWARDS ET AL   2,424,561
SYSTEM FOR LOCATING THE SOURCE OF AN EXPLOSION WAVE
Filed Dec. 28, 1943   2 Sheets-Sheet 2
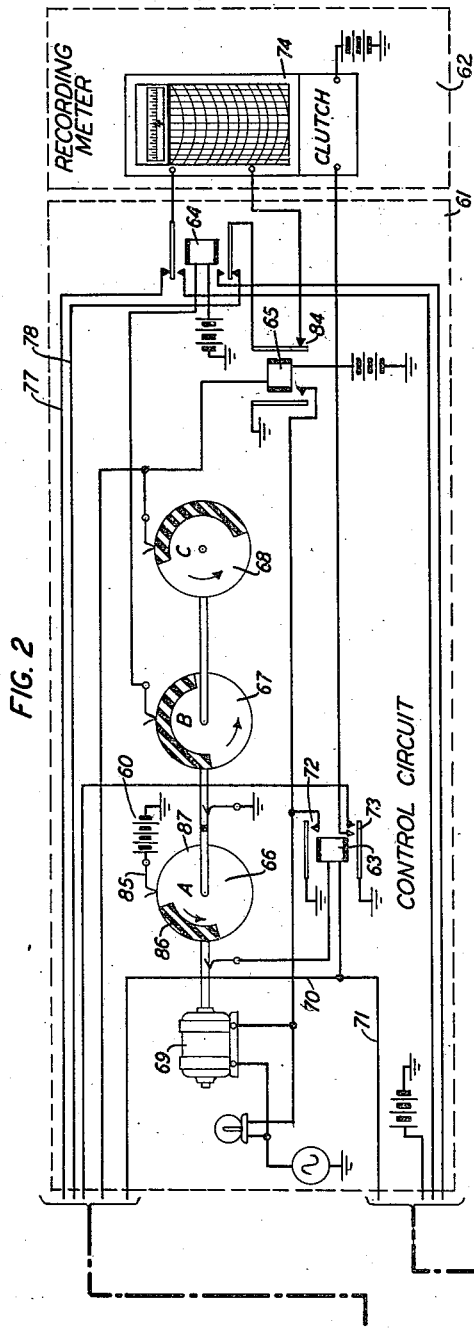
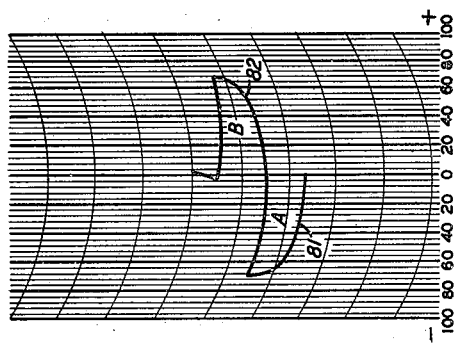
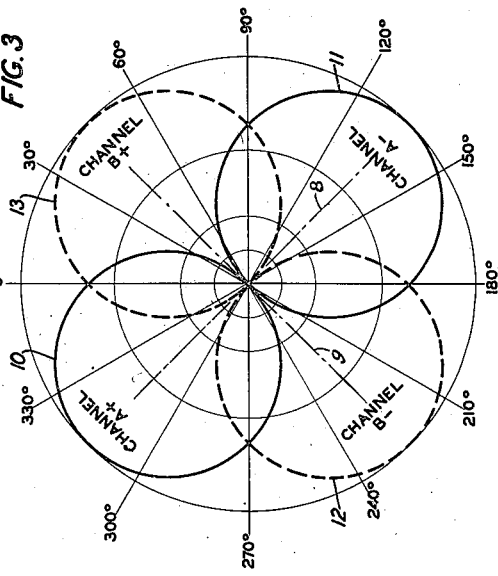
INVENTORS
P. G. EDWARDS
D. D. ROBERTSON
BY W. C. Parnell
ATTORNEY Patented July 29, 1947

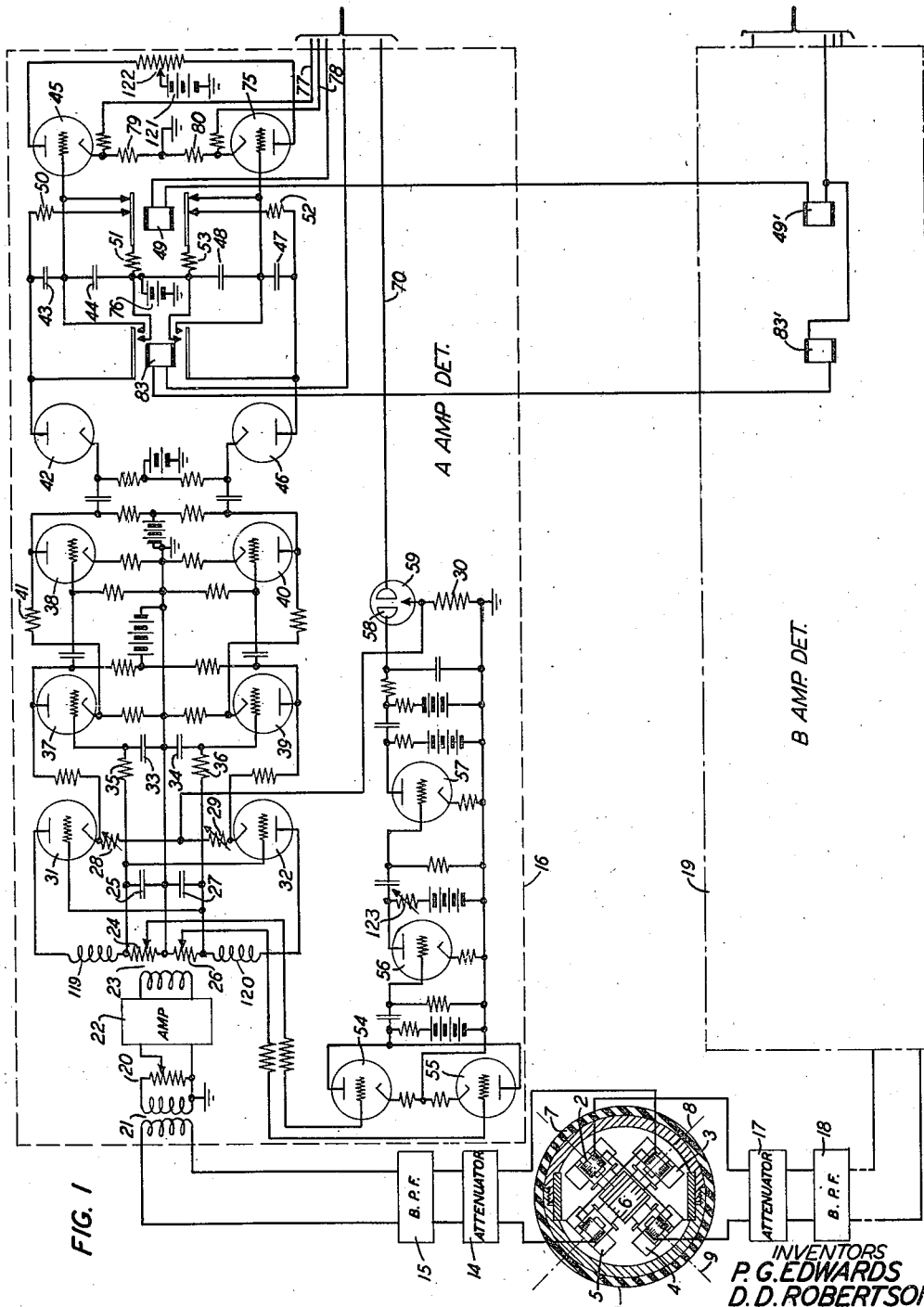
FIG. I
INVENTORS
P.G. EDWARDS
D.D. ROBERTSON
BY W.C. Parnell
ATTORNEY

2,424,561

UNITED STATES PATENT OFFICE 2,424,561

SYSTEM FOR LOCATING THE SOURCE
OF AN EXPLOSION WAVE

Paul G. Edwards, Verona, N. J., and Donald D. Robertson, Hartsdale, N. Y., assignors to Bell Telephone Laboratories, Incorporated, New York, N. Y., a corporation of New York Application December 28, 1943, Serial No. 515,888

8 Claims. (Cl. 234—1.5)

This invention relates to the location of the point of origin of an explosion wave in accordance with general principles of the system shown in the copending applications of W. D. Goodale et al. Serial No. 515,886, and W. R. Harry, Serial No. 515889, both filed December 28, 1943, and which applications matured into Patents 2,403,974 and 2,406,014, respectively.

In those applications it is pointed out that an explosion wave is an asymmetric transient including a first positive pulse of large amplitude but of very short duration followed by a negative pulse of smaller amplitude but of longer duration. Advantage is taken of this asymmetry to obtain an oscilloscope indication of the direction of the origin of such a wave by connecting the two sets of deflecting plates of the oscilloscope to two pressure gradient microphone units mounted on a common support with their axes of sensitivity in quadrature.

It is characteristic of such microphones that the magnitude of the electrical output for any sound pressure is proportional to the cosine of the angle of sound incidence and that the polarity of the output voltage reverses as the source of the waves crosses the axis of zero sensitivity. Two such devices in quadrature, therefore, give outputs of relatvie polarities which are distinctive of the quadrant from which the wave originated and of relative magnitudes such that there is a discrete pair of values for any angle within each quadrant.

In the Harry application the oscilloscope indication is improved by causing the initial pulse to make the circuits incapable of responding to the negative pulse and by increasing the duration of the pattern produced on the oscilloscope screen by the initial pulse.

However, the disabling feature of the Harry system excludes only the negative pressure pulse and this disabling is effective only for a very short interval so that, if the indication is greatly prolonged to facilitate more accurate observation, the pattern is obscured by echoes of the original wave.

The object of the present invention is to exclude all such extraneous effects and to make a permanent and accurate record of the response of the pick-up system so that the origin of an explosion may be determined with a high degree of accuracy.

According to the general features of this invention the original short pulses representing the response of the pick-up units to the first pulse of the explosion wave are suitably prolonged and amplified and then stored. The storing is preferably effected by using four condensers each corresponding to a principal direction from the pick-up point, or in other words, to one of the lobes of the pick-up pattern. The initial electrical pulse of either polarity energizes in each amplifier-detector circuit a delay circuit which, without interfering with the transmission of the initial pulses, becomes effective before any echoes can reach the pick-ups to prevent any further transmission for the remainder of the recording period.

The delay circuit also initiates the operation of control mechanism which associates a recorder with the two amplifier-detector circuits in succession to record the stored signals and then restores the whole system to the condition for responding to subsequent waves.

These and other features of the invention will be clearly understood from the following detail description and the drawing in which:

Fig. 1 shows the double unit pick-up device and amplifier-detector circuits of a system according to the invention;

Fig. 2 shows the recorder and the control circuit for the recorder;

Fig. 3 shows the cross-cosine response pattern of the pick-up device; and

Fig. 4 shows a typical recording of the first pulse of an explosion wave.

In Fig. 1, the pick-up 1, as in the related applications referred to above, is preferably of the type fully disclosed in the copending application of W. R. Harry, Serial No. 494,640, filed July 14, 1943, and comprises essentially four electromagnetic, inertia-type units, 2, 3, 4 and 5 of the general construction disclosed in Patent 2,202,906, granted to Hawley, June 4, 1940. These units are mounted on the four faces of a square supporting bar 6 within a spherical shell 7 with the oppositely disposed units in axial alignment and the axes 8 and 9 of the pairs of units intersecting at the center of the shell.

Each of the units 3 and 5 has a double-lobed directional pick-up characteristic as shown by the full-line curves 10, 11 of Fig. 3 and similarly each of the units 2 and 4 has a characteristic as shown by the dotted curves 12, 13 so that the required pick-up pattern may be obtained as stated above by only two of the units, such, for example, as 2 and 5. However, the four-unit structure shown is preferred because of its symmetry and by connecting the opposed units of each pair together in series-aiding relationship, the device becomes in effect a two-unit structure.

The units 3 and 5 of the pick-up are connected through a suitable attenuator 14 and band-pass filter 15 to the "A" amplifier-detector circuit 16 and the units 2 and 4 are similarly connected through an attenuator 17 and a band-pass filter 18 to the "B" amplifier-detector circuit 19 which is shown only diagrammatically since it is identical with the circuit 16. The attenuators are used for compensating for differences in the sensitivities of the pick-up units and the filters may have a pass band from 500 to 16,000 cycles per second to eliminate extraneous noise and hydrophone response irregularities outside the useful range.

As explained in more detail in the Goodale et al. application, an explosion wave arriving at the pick-up with any angle of incidence within the upper and lower quadrants defined by the axes 8 and 9 on Fig. 3 will cause the units of each pair to generate voltages of the same polarity, but for the upper quadrant these voltages will be of a different polarity, e. g., plus, from those in the lower quadrant where they will be of an opposite polarity, or minus. On the other hand, waves with angles of incidence within either lateral quadrant will produce in the paired units two voltages of opposite polarities, those from the right-hand quadrant producing minus voltages in the A circuit and plus voltages in the B circuit and those from the left-hand quadrant producing plus voltages in the A circuit and minus voltages in the B circuit.

As pointed out in the Harry application, an explosion wave is an asymmetric transient including a first initial pulse of large amplitude but of very short duration followed by a negative component of smaller amplitude but of longer duration. By a plus pulse is meant therefore one which has an initial large plus component followed by a much smaller negative component and by a minus pulse is meant one which has an initial large minus component followed by a much smaller positive component.

As indicated by the response curves, 10 to 13, the relative magnitudes of the voltages generated will vary with the angle of incidence within any quadrant so that, taking into account both the polarities and magnitudes, there will be generated a different pair of voltage values for each different angular position of the wave source with respect to the pick-up point.

A voltage generated by the units 3 and 5 due to the initial pulse of an explosion wave will induce voltages in the secondary windings 119 and 120 of the input transformer 23 but since the circuits associated with these windings each include a rectifier 31 or 32, there will be current in only one of these circuits depending on the electrical polarity of the pulse.

In the detector circuit the gain control 20 between the step-up transformer 21 and the conventional amplifier 22 provides a wide range of sensitivity adjustment to adapt the system for differences in working range. At the secondary side of the transformer 23 the circuit is divided, as in the case of the first Harry application referred to above, into two identical halves so poled that one half of the circuit rectifies and transmits a plus pulse and the other half rectifies and transmits a minus pulse.

If, for example, the pulse is such that the plate of rectifier 32 is positive with respect to the plate of rectifier 31, the latter will be non-conducting but there will be a current through the winding 120, the rectifier 32 with a return path by way of cathode resistor 29, resistor 30, ground and thence returning via resistor 26 and condenser 27 in parallel. Similarly for a pulse of opposite electrical polarity rectifier 32 will be non-conducting but there will be a current through winding 119, the rectifier 31, cathode resistor 28, resistor 30 and the parallel combination of resistor 24 and condenser 25.

If, for example, the initial part of a pulse is plus, it is rectified by tube 32, most of the voltage appearing across resistor 26 and condenser 27 since resistors 29 and 30 are relatively small. The ungrounded side of condenser 27 is negative so that through the cross-connections shown the control grid of tube 31 is biased negatively to such an extent that the final negative part of the pulse is not rectified by tube 31. In a similar manner a minus pulse is rectified and transmitted by tube 31. Rectifier tube 32 is disabled by means of the cross-connection to the grid as explained before so that the final positive part of the pulse is not rectified and will not affect the reading. The bias resistors 28 and 29 are preferably adjustable as shown to permit accurate equalization of sensitivity in the two halves of the circuit.

Also, as in the Harry application, the high voltage charges on the small condensers 25 and 27 are used to charge the much larger condensers 33 and 34, respectively, through suitable resistors 35 and 36, thereby greatly prolonging the pulses transmitted through the remainder of the circuit. The pulses transferred to the condenser 33 are amplified in the resistance-coupled conventional two-stage amplifier tubes 37 and 38, which are adapted to transmit efficiently down to very low frequencies by the direct current feedback resistor 41, and applied to the rectifier 42 to charge the series-connected condensers 43 and 44. Only the potential built up across the condenser 44 is effective in determining the amplitude of pulse recorded but by using the two condensers 43 and 44 as a voltage divider so that the tube 42 rectifies a relatively high voltage, this tube may operate on a substantially linear part of its characteristic without overloading the tube 45.

A similar circuit comprising amplifying tubes 39 and 40 and a rectifier tube 46 is provided for the pulses transferred to the condenser 34 and in the manner already explained such pulses result in the charging of the condensers 47 and 48. It will be noted that the relay 49, in the normal position shown, shunts resistors 50 to 53 across the pulse receiving condensers 43, 44, 47 and 48, respectively, but as will be explained, these shunts are removed just before the pulses are received. Since the condensers are charged through the rectifiers 42 and 46 they retain their charges without appreciable loss for the time required to complete the recording operation.

When the initial pulse is first received and builds up a potential across either resistor 24 or 26, a portion of this potential immediately appears as a negative bias on the grid of the tube 54 or 55, depending on the electrical polarity of the pulse. In either case, because of the parallel connection of the output circuits of these tubes, the resulting increase in plate potential is amplified by the two-stage, resistance-coupled, conventional amplifier tubes 56 and 57. The output of tube 57 is resistance-coupled to the control electrode 58 of the gas-filled tube 59 and raises the control electrode 58 of the gas-filled tube 59 to firing potential. Variation in sensitivity is accomplished by the variable load resistor 123. When the tube breaks down, current from the ittery 60 (Fig. 2) produces a potential drop in the resistor 30 which biases the tubes 31 and 32 to cut-off, thereby disabling both of them for the remainder of the recording period.

In order that this circuit will exclude all echoes without affecting the indicated values of the first pulse, it will, of course, be necessary to adjust the time constant in any well-known manner, such as by proper choice of the resistors and coupling condensers, to suit the requirements of the particular case. In general, the delay must be long enough to permit the condensers 25 and 27 to receive full charge and yet short enough to reject the pulse due to the first wave reflected from the nearest reflecting surface, such as the body or conning tower of the submarine on which the pick-up is mounted. In one case, for example, it was found that this delay should be of the order of 150 microseconds.

The control circuit 61 (Fig. 2) for the recording meter 62 comprises essentially three relays 63, 64, 65, three controlling cams 66, 67, 68 and a motor 69 with reduction gearing for driving the cams at a low speed, such as 7.5 revolutions per minute, to operate the relays in cyclic sequence. When the gas tube 59 or the corresponding tube in the circuit 19 of the other channel is fired, relay 63 is operated over a circuit extending from ground through the tube, conductor 70 or 71, the relay winding and the conducting portion 87 of the cam 66 to the grounded battery 69.

The closing of contact 72 of the relay 63 energizes the motor 69, and the closing of the lower contact 73 operates the clutch mechanism of the recording meter 74 to put the recording paper in motion and operates the relays 49 and 49' of the detector circuits 16 and 19 of Fig. 1. The operation of these relays removes the shunt connections from the condensers 43, 44 and 47, 48 (and the corresponding condensers of circuit 19) at about the time they are being selectively charged and thereby permits the grids of the tubes 45 and 75 to assume potentials as determined by the battery 76 and the charges on the condensers 44 and 48.

Plate current is supplied to the tubes 45 and 75 from a source 121. The plate circuit of the tube includes a potentiometer 122 for equalizing the plate currents. Direct curent from the battery 121 in the plate circuit flowing through the cathode biasing resistors 79 and 80 causes a voltage drop which, with the connection shown, has the right polarity to bias the grid of tubes 45 and 75 negatively with respect to the cathode. The tubes 45 and 75 comprise a cathode-follower stage of amplification. The recording meter 74, which may be a model AW of the Esterline Angus Company, is normally connected through the back contacts of relay 64 and conductors 77, 78 to the cathode-bias resistors 79, 80 of the tubes 45 and 75. These cathode-bias resistors are placed in the cathode circuit to provide a large amount of direct current feedback in the tubes 45 and 75 by the proper choice of these resistors which should be made large as compared with the potentiometer 122, thereby insuring linear operation as in the case of the preceding amplifier tubes, and in accordance with the well-known feedback characteristics of cathode-follower amplifiers. The tube cathodes are, therefore, operating at a considerable positive potential so that the battery 76 must be of sufficient voltage to reduce this negative grid bias to its proper value for linear operation. Assuming, for example, an incoming pulse which is electrically "minus" in the A amplifier detector circuit, the pulse is rectified by tube 31, most of the voltage appearing across resistor 24 and condenser 25. The ungrounded side of condenser 25 is negative so that through the cross-connection shown the control grid of tube 32 is biased negatively to such an extent that the final positive part of the pulse is not rectified by tube 31. Connected in parallel with condenser 25 and resistor 24 is the series-combination of resistor 35 and condenser 33, which slow up and considerably prolong the pulse. The pulse is amplified by the conventional resistance-coupled two-stage amplifying tubes 37 and 38 and applied to the rectifier tube 42 the load of which consists of condensers 43 and 44. The use of the rectifier 42 permits condensers 43 and 44 to be charged up but prevents the charge from leaking off back to the plate circuit of tube 38. The voltage which condenser 44 receives determines the magnitude of the reading of the recorder by controlling the cathode-follower amplifier tube 45. The grid of tube 45 will be driven more negative in accordance with the amplitude of the pulse, thereby reducing the plate current of tube 45 and the potential drop across resistor 79. This unbalances the meter and causes it to record a —A deflection as shown by the curve 81 of Fig. 4.

After an interval of about 2 seconds for this recording operation, the cam 67 will operate the relay 64 to transfer the recording meter to the B amplifier-detector circuit. Assuming that a plus pulse of equal magnitude has been received in the B amplifier-detector circuit, the condenser in the circuit 19, which corresponds to the condenser 48 of the circuit 16, will have been charged and the meter will, therefore, record a +B deflection as shown by the curve 82.

After a further interval of about 2 seconds the cam 68 will operate the relay 65 and also the relays 83 and 83' in the amplifier-detector circuits of Fig. 1. The relay 65 opens the meter circuit at contact 84 to return the recorder pen to zero and provide a definite separation between successive recordings and also closes an alternate supply circuit for the motor 69 independently of the relay 63. The operation of the relay 83 discharges the pulse receiving condensers 43, 44, 47 and 48 and relay 83' discharges the corresponding condensers of the circuit 19 in preparation for the reception of the next pulse.

After about 6 seconds the cam 66 restores the gas-filled tube 59 thereby removing the blocking bias on the rectifiers 31 and 32 due to the potential drop in resistor 30 and the simultaneous restoring of the corresponding tube in the circuit 19 unblocks the rectifiers of that circuit.

In restoring the gas tubes, cam 66 also releases the relay 63 which opens the meter clutch circuit to stop the recording paper but the motor 69 continues in operation over the circuit established by the relay 65. The release of relay 63 also releases the relays 49 and 49' of Fig. 1 to restore the shunt connections on the pulse receiving condensers to prevent them from building up extraneous charges prior to the reception of another explosion pulse.

At the end of 8 seconds the cam 68 releases relay 65, which opens the supply circuit of the motor 69 and releases the relays 83 and 83' to complete the restoration of the system to normal condition. At the instant the motor circuit is opened the brush 85 will still be in contact with the insulated portion 86 of the cam 66 but the momentum of the motor produces sufficient further rotation to bring the conducting part 81 of the cam into contact with the brush to reapply plate voltage to the gas tubes.

In the sample record shown since the curves 81 and 82 are A— and B+ indications, respectively, and are of equal magnitude, it is immediately apparent that the wave source is on the line of 90-degree incidence shown in Fig. 3. On the other hand, if the incidence had been 0 degrees, the A amplifier-detector circuit units would have charged condenser 27 instead of 25 and the curve 81 would have been reversed in sign as in the case of curve 82. It will be understood that for any intermediate angles of incidence within any quadrant the curves will be of unequal amplitudes which can be read from the scale on the record strip. The corresponding angle is then readily determined by plotting methods.

When the nature of the explosive charges is known, and particularly when the invention is used as a "practice attack meter" aboard a submarine being subjected to "practice attack" by small accurately calibrated charges, the amplitudes of the meter deflections also provide the data for determining quite accurately not only the direction of the explosion but also its distance from the submarine as explained in detail in the allowed application of P. G. Edwards, Serial No. 534,487, filed May 6, 1944.

While the invention has been described with reference to a particular system, it will be understood that the circuits shown may be modified in various ways within the scope of the following claims.

What is claimed is:

1. In a system for locating the source of an explosion wave, the combination with two directional microphone units of the cosine-type having their axes of sensitivity disposed in quadrature and an amplifier detector circuit for each microphone unit including two condensers and means for selectively charging one of the condensers according to the polarity of the first pulse of the wave picked up by the unit, of a recorder, recorder control mechanism for connecting the recorder to the circuits in succession to record the magnitude and polarity of the charges in each of the condensers so charged, and means in at least one of the circuits energized by the first pulse of the wave and effective after a predetermined interval to initiate the operation of the recorder control mechanism.

2. In a system for locating the source of an explosion wave, the combination with two directional microphone units of the cosine-type having their axes of sensitivity disposed in quadrature, and an amplifier-detector circuit for each microphone unit including means for storing a charge representing the magnitude and polarity of the first pulse of a wave picked up by the unit of a recorder, means for successively recording the stored charges and a delay circuit in each channel energized by the first pulse of the wave for preventing echoes of the wave from affecting the stored charges and for initiating the operation of the recording means.

3. A system according to claim 2 in which each amplifier-detector circuit includes two rectifiers poled to conduct pulses of opposite polarities and in which the delay circuit of each amplifier-detector circuit applies a blocking bias to both rectifiers of the amplifier-detector circuit.

4. A system according to claim 2 in which each charge is stored in a condenser having a charging path including a rectifier to prevent the loss of charge and a second condenser for causing the rectifier to operate on the linear portion of its characteristic.

5. A system according to claim 2 in which the charges are stored in condensers normally short-circuited to prevent the accumulation of extraneous charges and in which the short-circuits are opened under the control of the delay circuit.

6. In a system for locating the source of an explosion wave, four condensers corresponding to the four principal directions from a pick-up point, means responsive only to the first pulse of the wave for selectively charging two of the condensers to potentials representing the coordinates of the position of the wave source with respect to the pick-up point, a recorder, control mechanism therefor, means energized by the first pulse of the wave for actuating the control mechanism, and means operated by the control mechanism for connecting the recorder successively to the charged condensers, discharging the condensers and resetting the mechanism actuating means.

7. A system according to claim 6 in which the control mechanism actuating means includes a gas-filled trigger tube and an actuating circuit for introducing a predetermined delay in the firing of the tube.

8. A system according to claim 6 in which the control mechanism comprises a plurality of relays and a motor controlled by one of the relays for operating the relays in cyclic sequence.

PAUL G. EDWARDS.
DONALD D. ROBERTSON.

REFERENCES CITED

The following references are of record in the file of this patent:

FOREIGN PATENTS

| Number | Country | Date |
|---|---|---|
| 469,322 | Great Britain | 1937 |